United States Patent
Lee et al.

(10) Patent No.: US 9,637,652 B2
(45) Date of Patent: May 2, 2017

(54) SYSTEMS AND METHODS FOR MANUFACTURING PIGMENTED RADIATION CURABLE INKS FOR INK-BASED DIGITAL PRINTING

(71) Applicant: Xerox Corporation, Norwalk, CT (US)

(72) Inventors: Frank Ping-Hay Lee, Oakville (CA); Aurelian Valeriu Magdalinis, Aurora (CA); Marcel Breton, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 669 days.

(21) Appl. No.: 13/835,585

(22) Filed: Mar. 15, 2013

(65) Prior Publication Data

US 2014/0275338 A1 Sep. 18, 2014

(51) Int. Cl.
| | | |
|---|---|---|
| *C09D 11/101* | (2014.01) | |
| *C09D 7/14* | (2006.01) | |
| *C09D 7/12* | (2006.01) | |
| *C09B 67/46* | (2006.01) | |
| *C09D 11/037* | (2014.01) | |

(52) U.S. Cl.
CPC .......... *C09D 11/101* (2013.01); *C09B 67/009* (2013.01); *C09D 11/037* (2013.01)

(58) Field of Classification Search
CPC ....... C09D 11/101; C09D 7/14; C09D 7/1275
See application file for complete search history.

(56) References Cited

U.S. PATENT DOCUMENTS

| | | | | |
|---|---|---|---|---|
| 4,021,022 A | * | 5/1977 | Satterfield, III | .......... B29B 7/60 198/761 |
| 4,474,473 A | * | 10/1984 | Higuchi | .................. B29B 7/007 366/139 |
| 5,094,797 A | * | 3/1992 | Heel | ........................ C08J 3/226 264/211 |
| 5,985,019 A | * | 11/1999 | McCrae | .............. C09B 67/0069 106/400 |
| 6,365,648 B1 | * | 4/2002 | Couperus | ................. C08J 3/226 523/340 |
| 6,387,519 B1 | * | 5/2002 | Anderson | .............. B82Y 30/00 428/323 |
| 6,530,989 B1 | * | 3/2003 | Anantharaman | .... C09D 11/037 106/412 |
| 6,767,397 B2 | * | 7/2004 | Anantharaman | ... C09B 67/0021 106/493 |
| 7,947,126 B2 | * | 5/2011 | Teeley | .................... B01F 7/082 106/31.6 |
| 2003/0032692 A1 | * | 2/2003 | Mejiritski | ............ C09D 11/101 522/173 |
| 2004/0106703 A1 | * | 6/2004 | Etzrodt | ................... B32B 27/08 523/330 |
| 2004/0209088 A1 | * | 10/2004 | Retsch | ..................... C09D 7/12 428/447 |

(Continued)

*Primary Examiner* — Liam J Heincer
(74) *Attorney, Agent, or Firm* — Prass LLP

(57) ABSTRACT

A method for continuous production of radiation curable ink suitable for ink-based digital printing includes feeding ingredients suitable for forming a pigment concentrate to an extruder; blending the ingredients in the extruder to form a pigment concentrate paste; feeding additional ingredients to the extruder for blending with the ink concentrate to form an ink product configured for ink-based digital printing, wherein a pigment particle size is less than about 1 micron.

13 Claims, 7 Drawing Sheets

(56) References Cited

U.S. PATENT DOCUMENTS

| | | | | |
|---|---|---|---|---|
| 2006/0074176 | A1* | 4/2006 | Hohner | C08K 3/0033 524/515 |
| 2007/0022907 | A1* | 2/2007 | Becker | C08K 5/0041 106/271 |
| 2007/0060667 | A1* | 3/2007 | Jung | C08F 290/061 523/125 |
| 2008/0153963 | A1* | 6/2008 | Baran | C08K 3/32 524/414 |
| 2008/0271635 | A1* | 11/2008 | Haggata | C09B 63/005 106/31.73 |
| 2008/0282931 | A1* | 11/2008 | Niven | C09B 67/0033 106/31.28 |
| 2009/0062464 | A1* | 3/2009 | Lee | B01J 4/02 525/52 |
| 2009/0241800 | A1* | 10/2009 | Kyota | C09B 67/0014 106/31.85 |
| 2010/0186624 | A1* | 7/2010 | Wong | B41J 2/17593 106/31.61 |
| 2010/0190904 | A1* | 7/2010 | Wong | C09D 11/34 524/275 |
| 2010/0227186 | A1* | 9/2010 | Huffer | C07D 251/66 428/540 |
| 2010/0331460 | A1* | 12/2010 | Ootoshi | B82Y 30/00 524/88 |
| 2011/0057985 | A1* | 3/2011 | Kakino | C09D 11/101 347/21 |
| 2011/0227992 | A1* | 9/2011 | Matsumoto | C09D 11/101 347/21 |
| 2012/0056930 | A1* | 3/2012 | Fukagawa | C09D 11/101 347/20 |
| 2013/0309397 | A1* | 11/2013 | Breton | B41M 1/08 427/145 |
| 2013/0310517 | A1* | 11/2013 | Lee | C09D 11/101 524/789 |
| 2015/0131405 | A1* | 5/2015 | Zhou | B01F 5/0647 366/144 |
| 2015/0197647 | A1* | 7/2015 | Birau | C09D 11/02 522/181 |
| 2015/0299425 | A1* | 10/2015 | Lee | C08K 5/3417 106/498 |

* cited by examiner

SYSTEMS AND METHODS FOR MANUFACTURING PIGMENTED RADIATION CURABLE INKS FOR INK-BASED DIGITAL PRINTING

FIELD OF DISCLOSURE

The disclosure relates to manufacturing inks for ink-based digital printing. In particular, the disclosure relates to methods and systems for continuous ink manufacturing processes.

BACKGROUND

Ink-based digital printing systems, or variable data lithography systems configured for digital lithographic printing, may include an imaging system for laser patterning a layer of dampening fluid applied to an imaging member having a reimageable surface. The resulting latent image is inked to form an ink image for transfer to a printable medium, for example. Such systems are disclosed in U.S. patent application Ser. No. 13/095,714 ("714 Application"), titled "Variable Data Lithography System," filed on Apr. 27, 2011 by Stowe et al., which is commonly assigned, and the disclosure of which is hereby incorporated by reference herein in its entirety. The 714 Application discloses exemplary systems and methods for providing variable data lithographic and offset lithographic printing or image receiving medium marking.

Methods have been proposed for producing radiation curable inks that are liquid and suitable for ink-based digital printing using variable data lithography systems, such as those disclosed by the 714 Application. U.S. patent application Ser. No. 13/474,185 ("185 Application"), titled "Methods for Manufacturing Curable Inks for Digital Offset Printing Applications and the Inks Made Therefrom," filed May 17, 2012 by Lee et al. The disclosure of the 185 Application is hereby incorporated by reference herein in its entirety. The 185 Application discloses batch processes for manufacturing improved liquid radiation curable inks that do not gel upon application, have high pigment loading and, optionally, high viscosity as desired.

Inks formulated for ink-based digital printing differ from solid and gel inks. For example, digital offset inks contain a high pigment load—up to ten times higher than solid or gel inks—and therefore have a higher viscosity at room temperature and/or the temperature of application of the ink to the imaging member surface. High shear is required to mix in pigment and to achieve an acceptable pigment particle size. High-shear mixing may, however, cause the ink to gel. This problem, inter alia, is addressed by batch processing for manufacturing liquid radiation curable inks disclosed by the 185 Application, which uses a multi-component system to carry out a multi-step batch process that includes batch mixing and powder dispersion into pigment concentration, three-roll milling, batch mixing of the pigment concentrate into ink, and another step of three-roll milling to produce a batch of radiation curable liquid ink.

SUMMARY

Although effective for initial product development and small scale production, it has been found that the batch process can be labor intensive, suffer from long processing times, and require a large amount of physical space with low throughput per equipment capacity. Difficulties pertaining to batch-to-batch quality control and scale-up challenges may also arise. Systems and methods are provided for continuous ink manufacturing processes that are more economical, easier to monitor, control, and automate, and are suitable for manufacturing large quantities of ink.

Radiation-curable ink production methods may include providing ink ingredients to a first end of a mixing chamber, the ingredients being selected for forming pigment concentrate; and blending the ink ingredients by conveying the ingredients toward a second end of the mixing chamber to form a pigment concentrate in the mixing chamber, the pigment concentrate having a pigment particle diameter of about 1 micron or less. Methods may include the providing ingredients further including feeding the ingredients into a mixing chamber of the mixer at a feed port at the first end of the mixing chamber, the ingredients comprising pigment and at least one of monomers, oligomers, dispersant, thermal stabilizer, and viscosity modifier, the viscosity modifier being selected from the group comprising: clay and silica.

Methods may include pre-heating the mixing chamber to a temperature lying in range of 25 degrees Celsius to 90 degrees Celsius. In an embodiment, a mixing chamber temperature lies in a range of 25 degrees Celsius to 90 degrees Celsius during the blending, and wherein a die head pressure of the mixing chamber lies in a range of 2 to 100 psi. In an embodiment, methods may include feeding additional ink ingredients to the mixing chamber for mixing with the pigment concentrate; and blending the additional ink ingredients with the pigment concentrate in the mixing chamber to produce an ink product.

Methods may include outputting the ink product from the mixing chamber at the second end. Methods may include feeding the pigment concentrate to the mixing chamber at the first end of the mixing chamber; feeding additional ink ingredients to the mixing chamber for mixing with the pigment concentrate; and blending the additional ink ingredients with the pigment concentrate in the mixing chamber to produce an ink product by conveying the ink ingredients toward the second end for output from the mixing chamber.

In an embodiment, the mixing chamber may be a first mixing chamber, and methods may include feeding the pigment concentrate to a second mixing chamber at a first end of the second mixing chamber; feeding additional ink ingredients into the second mixing chamber, the ingredients comprising at least one of low-viscosity monomers, oligomers, or mixtures thereof, and leveling agent; and blending the pigment concentrate and the additional ink ingredients in the second mixing chamber to produce an ink product by conveying the ink ingredients toward the second end for output from the second mixing chamber. In an embodiment, the providing ink ingredients may further include feeding at least one of low-viscosity monomers, oligomers, or mixtures thereof, and leveling agent to the mixing chamber.

Methods may include cooling the ink product; and outputting the ink product from the mixer. Methods may include processing the ink product using a 3-roll mill.

Systems for producing radiation curable ink for ink-based digital printing may include a mixing chamber having a first end and a second end; and a feed port connected to the first end, wherein the mixing chamber is configured for conveying ink ingredients fed to the mixing chamber at the feed port of the first end toward the second end to mix the ingredients. In an embodiment, the mixing chamber may be a first mixing chamber, the system having a second mixing chamber, the second mixing chamber being connected in series with the first mixing chamber for accepting a pigment concentrate output from the first mixing chamber. In an embodiment, the feed port may be a first feed port, the system having a downstream feed port for receiving additional ink ingredients, the mixing chamber being configured to convey ink ingredients from the first end of the mixing chamber toward the second end of the mixing chamber to blend the ink ingredients to form a paste at a point in the mixing chamber that interposes the first end and the second end, and being configured to convey the additional ingredients and the pigment concentrate toward the second end to form an ink product at the second end.

A non-transitory computer-computer readable medium storing instructions for causing a mixing system to produce radiation curable ink suitable for ink-based digital printing may contain instructions including causing a feed device to provide to a mixing chamber ingredients for blending to form a pigment concentrate; and causing the mixing chamber to blend the ink ingredients to from a pigment concentrate paste by conveying the ingredients from a first end of the mixing chamber toward a second end of the mixing chamber. Instructions may include causing a feed device to provide to the mixing chamber additional ink ingredients for blending in the mixing chamber with the pigment concentrate to form an ink product.

In an embodiment, the mixing chamber may be a first mixing chamber, and the instructions may include causing a feed device to provide the pigment concentrate to a second mixing chamber; causing a feed device to provide to the second mixing chamber additional ink ingredients; and causing the second mixing chamber to convey the pigment concentrate and the additional ink ingredients from a first end of the second mixing chamber to a second end of the mixing chamber to blend the pigment concentrate and the additional ink ingredients to for a homogenous ink product. In an embodiment, the instructions may include causing the mixing chamber to convey the pigment concentrate and the additional ink ingredients from a first end of the mixing chamber to a second end of the mixing chamber to blend the pigment concentrate and the additional ink ingredients for forming an ink product.

In an embodiment, the causing the second mixing chamber to convey may include blending the pigment concentrate and the additional ink ingredients to form an ink product having a pigment particle size of less than about 1 micron in diameter. In an embodiment, the causing the mixing chamber to convey may further include blending the pigment concentrate and the additional ink ingredients to form an ink product having a pigment particle size of less than about 1 micron in diameter.

Exemplary embodiments are described herein. It is envisioned, however, that any system that incorporates features of apparatus and systems described herein are encompassed by the scope and spirit of the exemplary embodiments.

DETAILED DESCRIPTION

Figure 1:
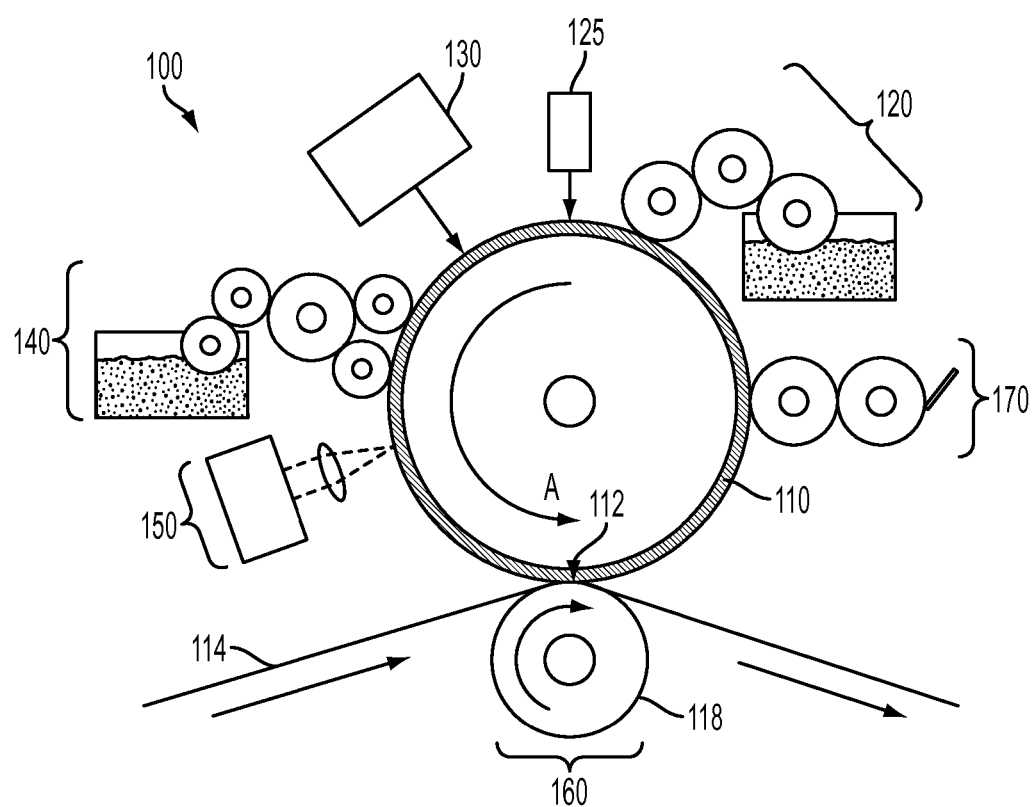
FIG. 1 shows a related art ink-based digital printing system for printing ink images based on variable image data using inks produced by systems and methods of embodiments.

Exemplary embodiments are intended to cover all alternatives, modifications, and equivalents as may be included within the spirit and scope of the apparatus and systems as described herein.

Reference is made to the drawings to accommodate understanding of systems and methods for continuous manufacture of ink suitable for ink-based digital printing. In the drawings, like reference numerals are used throughout to designate similar or identical elements. The drawings depict various embodiments of illustrative systems and methods for continuous manufacture of ink suitable for ink-based digital printing using.

The modifier "about" used in connection with a quantity is inclusive of the stated value and has the meaning dictated by the context (for example, it includes at least the degree of error associated with the measurement of the particular quantity). When used with a specific value, is should also be considered as disclosing that value.

Inks suitable for ink-based digital printing, including radiation-curable inks, must be capable of adhering to a transfer medium, or an imaging member such as a printing plate or rubber coated roll, should be easily released from the transfer medium to a printable medium, and should not mix with a fluid such as dampening fluid, for example, fountain solution, used to form the image on the transfer medium. While radiation curable inks for variable data offset printing, or ink-based digital printing, and batch processes for manufacture thereof are disclosed in the 185 Application, systems and methods are provided that include the continuous manufacture of liquid radiation curable ink in accordance with systems and methods of embodiments uses a high-torque, high shear, mixing system such as a screw-mixing system. The screw mixing system may be a now known or later developed single-screw or twin-screw extruder.

A continuous radiation curable ink manufacturing process may include a setting the extruder screw(s) temperature and screw(s) speed, allowing the extruder to reach a steady state wherein an initial mixing temperature or a temperature of the mixing chamber containing the screw(s), and mixing screw speed(s) are established as desired. Then, ink ingredients may be fed continuously into the mixing system to form a pigment concentrate. In particular, monomer, oligomer, dispersant, pigment, thermal stabilizer, and viscosity modifier are fed into a mixing chamber of the mixing system through a feed port. The ingredients are blended to form a pigment concentrate paste as the ingredients are conveyed from a first end of the mixing chamber to a second end of the mixing chamber. Systems and methods of embodiments are configured for forming a pigment concentrate having a pigment particle size of about 1 micron or less.

Additional ingredients may be fed into a downstream feed port and blended with the pigment concentrate to form a radiation curable ink product suitable for ink-based digital printing. For example, additional ink ingredients including as leveling agents and viscosity modifiers, such as silica or clay, may be added to the mixing chamber through a second feed port as the ingredients pass through the ink chamber. The additional ingredients are blended with the pigment concentrate to form an ink product. The ink product may be cooled and discharged continuously into downstream processing equipment, holding tanks, ink packaging equipment, and/or other downstream processing systems and methods.

The inks ingredients may be fed or metered continuously and proportionally into port(s) of a mixing system using volumetric or gravimetric feeding devices, such as screw feeders or pumps. Rotating screws inside the feed device(s) convey the ingredients, de-agglomerate the pigment into particulates of about 1 micron in diameter, and distribute pigment particles evenly in a homogenous mixture of ink ingredients to form a pigmented ink concentrate, or pigment concentrate paste that is usable for forming an ink product.

In some embodiments, the mixing chamber may be an extruder, such as a single screw or twin-screw extruder that is divided into, for example, three temperature zones. Each zone may be independently heated and/or cooled, which may enable control over conveyance of the ingredients at desired temperatures. A temperature in a particular temperature zone of the extruder may be optimized to ensure adequate shear force during mixing for breaking up pigment aggregates and dispersing ink ingredients and form a homogenous pasty mixture. A rotating speed of the extruder screw(s) and torque may be adjusted for ensuring adequate shear force for producing a pigmented ink concentrate and/or ink product by conveying ink ingredients fed into the mixing chamber.

Systems may include a single or multiple extruder arrangement. For example, systems may include a single extruder providing a single mixing chamber. Methods may include using single extruder systems to form an ink product by passing ink ingredients from a first end of the mixing chamber to a second end of the mixing chamber as discussed above.

Alternatively, systems may include two extruders that are connected in series. Methods may include using a two-extruder system to form an ink product by passing appropriate ink ingredients through a first extruder configured to form a pigment concentrate. The pigment may be discharged into storage drums, and/or may be fed back into the extruder at the first end and conveyed with additional appropriate ingredients to form an ink product. Methods further include subsequently passing the pigment concentrate through a second extruder that is connected in series with the first extruder to form an ink product by conveying and mixing the pigment concentrate and additional ink ingredients.

In another embodiment, systems may include a single extruder through which appropriate ingredients are fed into an extruder and conveyed from a first end of the extruder to a second end of the extruder to form a pigment concentrate on a first pass through the extruder. The pigment may be discharged into storage drums, and/or may be fed back into the extruder at the first end and conveyed with additional appropriate ingredients to form an ink product. The ink ingredients are selected from ingredients suitable for preparing radiation curable inks useful ink-based digital printing, as disclosed in the 185 application. Ink-based digital printing system for variable data printing using a reimageable imaging member are disclosed in the 185 application, and in the 714 Application.

The 714 Application describes an exemplary variable data lithography system 100 for ink-based digital printing, such as that shown, for example, in FIG. 1. A general description of the exemplary system 100 shown in FIG. 1 is provided here. Additional details regarding individual components and/or subsystems shown in the exemplary system 100 of FIG. 1 may be found in the 714 Application.

As shown in FIG. 1, the exemplary system 100 may include an imaging member 110. The imaging member 110 in the embodiment shown in FIG. 1 is a drum, but this exemplary depiction should not be interpreted so as to exclude embodiments wherein the imaging member 110 includes a drum, plate or a belt, or another now known or later developed configuration. The reimageable surface may be formed of materials including, for example, a class of materials commonly referred to as silicones, including polydimethylsiloxane (PDMS), among others. The reimageable surface may be formed of a relatively thin layer over a mounting layer, a thickness of the relatively thin layer being selected to balance printing or marking performance, durability and manufacturability.

The imaging member 110 is used to apply an ink image to an image receiving media substrate 114 at a transfer nip 112. The transfer nip 112 is formed by an impression roller 118, as part of an image transfer mechanism 160, exerting pressure in the direction of the imaging member 110. Image receiving medium substrate 114 should not be considered to be limited to any particular composition such as, for example, paper, plastic, or composite sheet film. The exemplary system 100 may be used for producing images on a wide variety of image receiving media substrates. The 714 Application also explains the wide latitude of marking (printing) materials that may be used, including marking materials with pigment densities greater than 10% by weight. As does the 714 Application, this disclosure will use the term ink to refer to a broad range of printing or marking materials to include those which are commonly understood to be inks, pigments, and other materials which may be applied by the exemplary system 100 to produce an output image on the image receiving media substrate 114.

The 714 Application depicts and describes details of the imaging member 110 including the imaging member 110 being comprised of a reimageable surface layer formed over a structural mounting layer that may be, for example, a cylindrical core, or one or more structural layers over a cylindrical core.

The exemplary system 100 includes a dampening fluid subsystem 120 generally comprising a series of rollers, which may be considered as dampening rollers or a dampening unit, for uniformly wetting the reimageable surface of the imaging member 110 with dampening fluid. A purpose of the dampening fluid subsystem 120 is to deliver a layer of dampening fluid, generally having a uniform and controlled thickness, to the reimageable surface of the imaging member 110. As indicated above, it is known that a dampening fluid such as fountain solution may comprise mainly water optionally with small amounts of isopropyl alcohol or ethanol added to reduce surface tension as well as to lower evaporation energy necessary to support subsequent laser patterning, as will be described in greater detail below. Small amounts of certain surfactants may be added to the fountain solution as well. Alternatively, other suitable dampening fluids may be used to enhance the performance of ink based digital lithography systems. Exemplary dampening fluids include water, Novec 7600 (1,1,1,2,3,3-Hexafluoro-4-(1,1,2,3,3,3-hexafluoropropoxy)pentane and has CAS#870778-34-0.), and D4 (octamethylcyclotetrasiloxane). Other suitable dampening fluids are disclosed, by way of example, in co-pending U.S. patent application Ser. No. 13/284,114, filed on Oct. 28, 2011, titled DAMPENING FLUID FOR DIGITAL LITHOGRAPHIC PRINTING, the disclosure of which is hereby incorporated herein by reference in its entirety.

Once the dampening fluid is metered onto the reimageable surface of the imaging member 110, a thickness of the dampening fluid may be measured using a sensor 125 that may provide feedback to control the metering of the dampening fluid onto the reimageable surface of the imaging member 110 by the dampening fluid subsystem 120.

After a precise and uniform amount of dampening fluid is provided by the dampening fluid subsystem 120 on the reimageable surface of the imaging member 110, and optical patterning subsystem 130 may be used to selectively form a latent image in the uniform dampening fluid layer by imagewise patterning the dampening fluid layer using, for example, laser energy. Typically, the dampening fluid will not absorb the optical energy (IR or visible) efficiently. The reimageable surface of the imaging member 110 should ideally absorb most of the laser energy (visible or invisible such as IR) emitted from the optical patterning subsystem 130 close to the surface to minimize energy wasted in heating the dampening fluid and to minimize lateral spreading of heat in order to maintain a high spatial resolution capability. Alternatively, an appropriate radiation sensitive component may be added to the dampening fluid to aid in the absorption of the incident radiant laser energy. While the optical patterning subsystem 130 is described above as being a laser emitter, it should be understood that a variety of different systems may be used to deliver the optical energy to pattern the dampening fluid.

The mechanics at work in the patterning process undertaken by the optical patterning subsystem 130 of the exemplary system 100 are described in detail with reference to FIG. 5 in the 714 Application. Briefly, the application of optical patterning energy from the optical patterning subsystem 130 results in selective removal of portions of the layer of dampening fluid.

Following patterning of the dampening fluid layer by the optical patterning subsystem 130, the patterned layer over the reimageable surface of the imaging member 110 is presented to an inker subsystem 140. The inker subsystem 140 is used to apply a uniform layer of ink over the layer of dampening fluid and the reimageable surface layer of the imaging member 110. The inker subsystem 140 may use an anilox roller to meter an offset lithographic ink onto one or more ink forming rollers that are in contact with the reimageable surface layer of the imaging member 110. Separately, the inker subsystem 140 may include other traditional elements such as a series of metering rollers to provide a precise feed rate of ink to the reimageable surface. The inker subsystem 140 may deposit the ink to the pockets representing the imaged portions of the reimageable surface, while ink on the unformatted portions of the dampening fluid will not adhere to those portions.

The cohesiveness and viscosity of the ink residing in the reimageable layer of the imaging member 110 may be modified by a number of mechanisms. One such mechanism may involve the use of a rheology (complex viscoelastic modulus) control subsystem 150. The rheology control system 150 may form a partial crosslinking core of the ink on the reimageable surface to, for example, increase ink cohesive strength relative to the reimageable surface layer. Curing mechanisms may include optical or photo curing, heat curing, drying, or various forms of chemical curing. Cooling may be used to modify rheology as well via multiple physical cooling mechanisms, as well as via chemical cooling.

The ink is then transferred from the reimageable surface of the imaging member 110 to a substrate of image receiving medium 114 using a transfer subsystem 160. The transfer occurs as the substrate 114 is passed through a nip 112 between the imaging member 110 and an impression roller 118 such that the ink within the voids of the reimageable surface of the imaging member 110 is brought into physical contact with the substrate 114. With the adhesion of the ink having been modified by the rheology control system 150, modified adhesion of the ink causes the ink to adhere to the substrate 114 and to separate from the reimageable surface of the imaging member 110. Careful control of the temperature and pressure conditions at the transfer nip 112 may allow transfer efficiencies for the ink from the reimageable surface of the imaging member 110 to the substrate 114 to exceed 95%. While it is possible that some dampening fluid may also wet substrate 114, the volume of such a dampening fluid will be minimal, and will rapidly evaporate or be absorbed by the substrate 114.

In certain offset lithographic systems, it should be recognized that an offset roller, not shown in FIG. 1, may first receive the ink image pattern and then transfer the ink image pattern to a substrate according to a known indirect transfer method.

Following the transfer of the majority of the ink to the substrate 114, any residual ink and/or residual dampening fluid must be removed from the reimageable surface of the imaging member 110, preferably without scraping or wearing that surface. An air knife may be employed to remove residual dampening fluid. It is anticipated, however, that some amount of ink residue may remain. Removal of such remaining ink residue may be accomplished through use of some form of cleaning subsystem 170. The 714 Application describes details of such a cleaning subsystem 170 including at least a first cleaning member such as a sticky or tacky member in physical contact with the reimageable surface of the imaging member 110, the sticky or tacky member removing residual ink and any remaining small amounts of surfactant compounds from the dampening fluid of the reimageable surface of the imaging member 110. The sticky or tacky member may then be brought into contact with a smooth roller to which residual ink may be transferred from the sticky or tacky member, the ink being subsequently stripped from the smooth roller by, for example, a doctor blade.

The 714 Application details other mechanisms by which cleaning of the reimageable surface of the imaging member 110 may be facilitated. Regardless of the cleaning mechanism, however, cleaning of the residual ink and dampening fluid from the reimageable surface of the imaging member 110 is essential to preventing ghosting in the proposed system. Once cleaned, the reimageable surface of the imaging member 110 is again presented to the dampening fluid subsystem 120 by which a fresh layer of dampening fluid is supplied to the reimageable surface of the imaging member 110, and the process is repeated.

Figure 2:
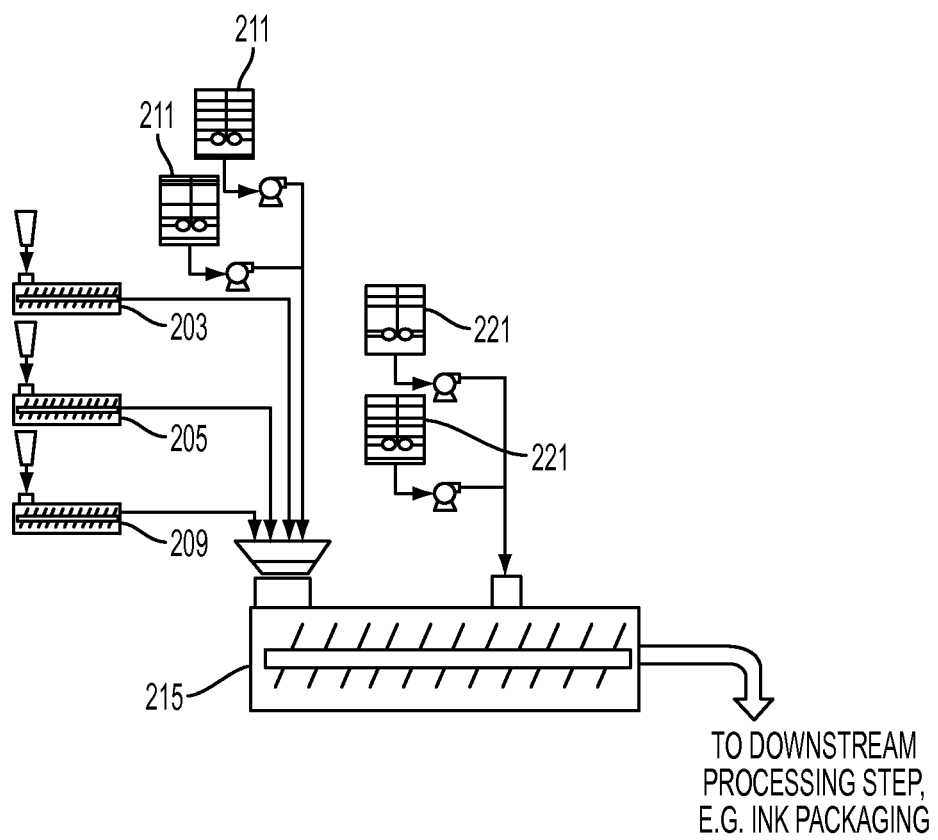
FIG. 2 shows a system for continuous manufacture of inks suitable for ink-based digital printing in accordance with an exemplary embodiment.

According to the above proposed structure, variable data digital lithography, or ink-based digital printing, has attracted attention in producing truly variable digital images in a lithographic image forming system. FIG. 2 shows a system for continuous manufacture of liquid inks suitable for ink-based digital printing using systems such as those shown in FIG. 1. In particular, FIG. 2 shows a continuous mixing system. The mixing system includes a first ingredient feed device 203. The ingredient feed device 203 may be used to feed ingredients for forming ink including monomer(s), oligomer(s), pigment, dispersant, photo-initiators, thermal stabilizer, and viscosity modifiers such as silica or clay into the continuous manufacture system for further processing. The ingredient feed device(s) may comprise a screw feeder with an input port and an output. The feed device 203 is configured to carry materials from the input port to the output of the device, which is connected to a main mixing chamber of the system.

Systems may include one or more feed devices, such as feed device 205, and feed device 209 which are each configured to separately feed materials to a feed port of a downstream processing device. The ingredients of the radiation curable ink may be fed separately by plural feed devices as shown, or may be blended and fed by a single feed device, for example.

As shown in FIG. 2, additional upstream monomer delivery devices 211 may be configured for feeding monomers to the feed port to which output ports of feed devices 203, 205, and 209 are connected or configured for delivering material to a mixing chamber or extruder housing. Upstream monomer delivery devices 211 are configured for controlled delivery of high-viscosity monomers, which may be added to adjust a viscosity of ink product being produced.

The mixing system of FIG. 2 may include a main mixing housing or chamber such as main extruder 215. The main extruder 215 may include a single screw or a twin screw arrangement, or other mixing system now known or later developed suitable for conveying ink ingredients to form a pigment concentrate having a particle size of about 1 micron in diameter or less. The main extruder 215 includes a feed port to which are connected the feed devices 203, 205, and 209, and upstream material delivery devices 211. The single or twin screw system of the main extruder 215 is configured to convey materials from the feed port to an output of the extruder, which is connected to downstream systems for further processing, such as 3-roll milling and ink packaging, for example.

Downstream monomer delivery devices 221 may be connected to the main extruder 215 at a point interposing the feed port and the output of the main extruder 215. Low-viscosity monomers may be introduced to ink ingredients being conveyed through the main extruder 215 by adding the monomers through the material delivery devices 221. Low-viscosity monomers may be added to pigment concentrate to decrease a viscosity of ink product produced by the extruder, for example. Portions of the main extruder 215 may be configured for separate temperature control for enabling control over a temperature at which the ink ingredients are conveyed at specific portions of the main extruder 215.

A mixing system suitable for manufacturing digital offset inks using a continuous process should have at least one screw for conveying, high-shear, and high torque mixing, and temperature control configured for melting conveyed material as desired. To produce a pigment concentrate and then an ink product in one pass through a mixing system, the system may include multiple solid or liquid material feed devices located both upstream and along a path of the mixing chamber. Alternatively, the system may be configured for producing the pigment concentrate in a first pass through a mixing system, and a pigmented ink product in a second pass through the mixing system. In various embodiments, methods may include passing ink components through a mixing chamber once through a single extruder, twice through a single extruder, or once through each of two extruders connected in series, for example.

Suitable extruders or mixing systems are available from manufacturers such as DAVO, WARNER & PFEIDERER, and LEISTRITZ. Exemplary mixing systems suitable for continuous production of liquid radiation curable ink suitable for ink-based digital printing includes READCO's KURIMOTO CONTINUOUS PROCESSOR, and BUHLER's CONTI-MIXER. Such systems include single or twin screw extruders wherein the screws are positioned inside a barrel or chamber that is divided into sections of zones configured for conveying material, and kneading of conveyed material.

Raw ink ingredients in the form of solids or liquids may be fed into the chamber at various locations either by gravity or under pressure using conveyors and/or pumps. The mixing system may be configured for enabling a user to set a temperature at different zones of the mixing chamber, chamber pressure, screw speed, and accommodate monitoring of torque exerted on, and current drawn by a drive motor configured to drive the screw(s) of the mixing system.

Typical processing conditions suitable for radiation curable ink continuous production processes include a mixing chamber temperature lying in a range of about 25 degrees Celsius to 90 degrees Celsius. The temperature may be achieved by using, for example, electric heating systems, air, or cooling media, for example. The resulting die head pressure may be in range of 2 psi to about 100 psi. The throughput or screw speed, torque or drive motor current settings are variable and may be depend on selected mixing equipment, screw selection, system configuration, and ink formulation. For continuous liquid ink production in accordance with a preferred embodiment, the system is configured to enable a residence time within the mixing chamber of less than 1 minute. Optionally components for 3-roll milling may be implemented downstream of the extruder for further processing of the ink product.

Figure 3:
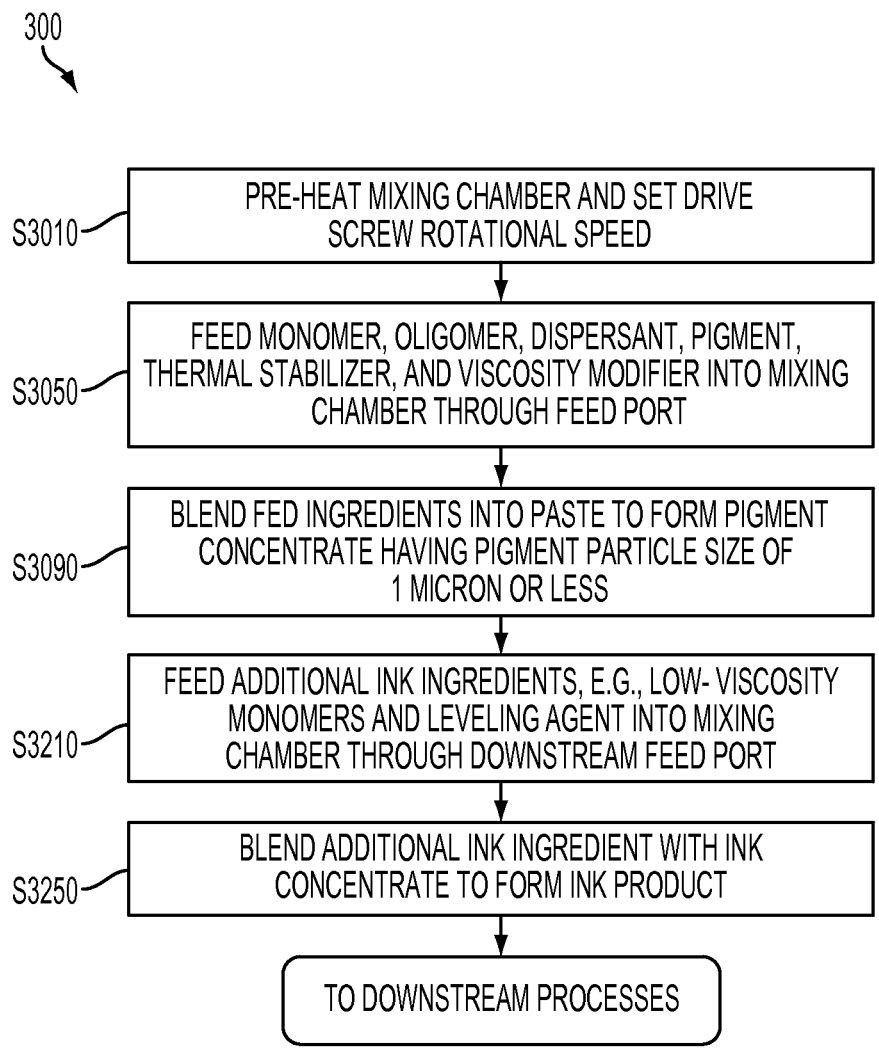
FIG. 3 shows methods for continuous manufacture of inks suitable for ink-based digital printing in accordance with another exemplary embodiment.

FIG. 3 shows methods for continuous ink production using a mixing system having a single extruder, wherein the system is arranged for forming an ink product by conveying ink ingredients in a single pass. As shown in FIG. 3, methods 400 in accordance with a preferred embodiment may include initializing the system by, for example, pre-heating a mixing chamber and setting drive motor rotational speed at S3010. Methods may include feeding ink ingredients at S3050 through one or more feed ports connected to the mixing chamber, such ingredients including monomers, oligomers, dispersant, pigment, thermal stabilizer, and viscosity modifiers such as silica and clay. The monomers may be high viscosity monomers, for example.

The ingredients are conveyed and blended at S3090 by the mixing chamber using high shear force to preferably produce pigment particulates of less than about 1 micron. The ingredients fed into the mixing chamber are selected for forming a pigment concentrate at S3090.

At S3210, additional ink ingredients may be fed into a downstream feed port of the mixing chamber. The additional ink ingredients, such as low-viscosity monomers and leveling agent, are selected for forming an ink product with the pigment concentrate past formed at S3090 as the ingredients and pigment concentrate are blended at S3250. Ink product is formed as the ingredients blended with pigment concentrate are conveyed to a second end of the mixing chamber. The ink product may be cooled and discharged for further processing and/or packaging.

Figure 4:
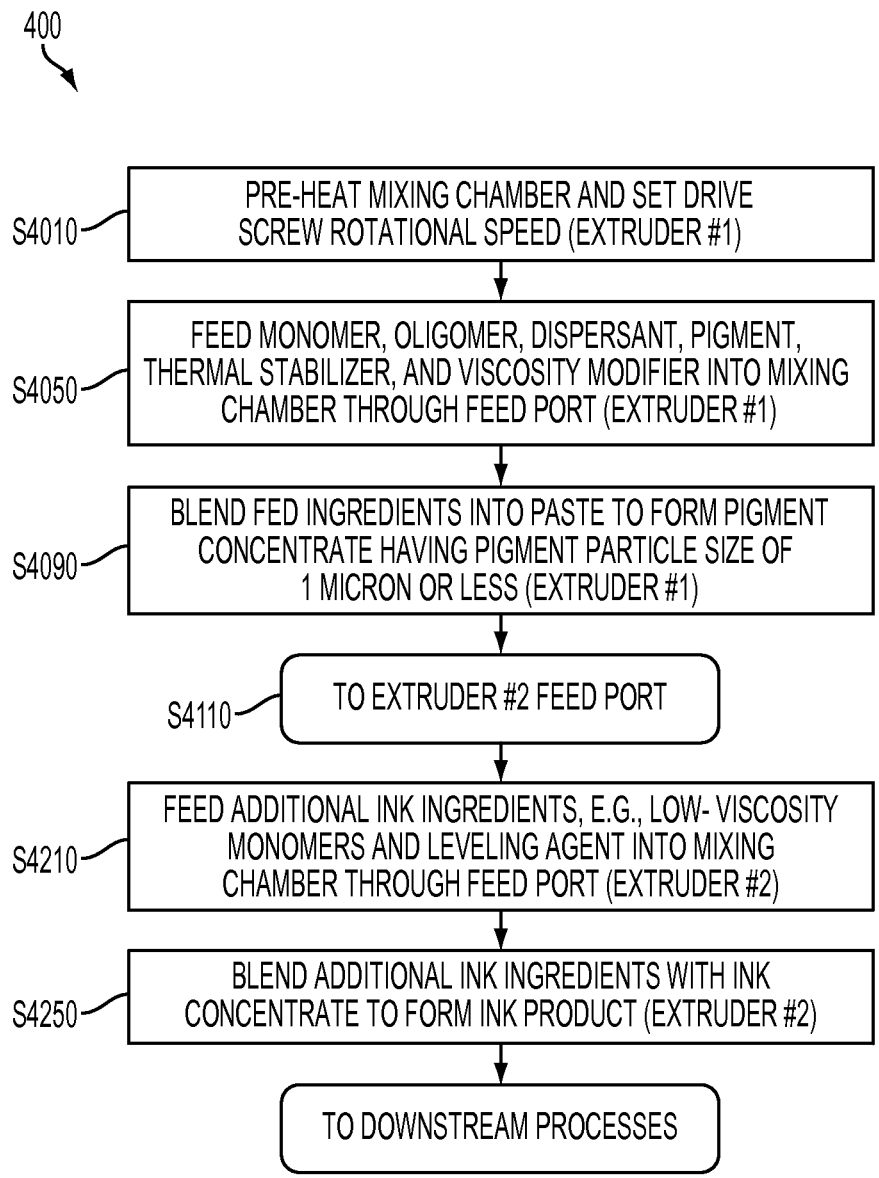
FIG. 4 shows methods continuous manufacture of inks suitable for ink-based digital printing in accordance with another exemplary embodiment.

FIG. 4 shows methods for continuous ink production using a mixing system having two extruders connected in series, wherein the system is arranged for forming an ink product by conveying ink ingredients in a single pass through a first extruder, and a single pass through a second extruder. As shown in FIG. 4, methods 400 may include initializing the system by, for example, pre-heating a first mixing chamber and setting drive motor rotational speed at S4010. Methods may include feeding ink ingredients at S4050 through one or more feed ports connected to the mixing chamber, such ingredients including monomers, oligomers, dispersant, pigment, thermal stabilizer, and viscosity modifiers such as silica and clay. The monomers may be high viscosity monomers, for example.

The ingredients are conveyed and blended at S4090 by the mixing chamber using high shear force to preferably produce pigment particulates of less than about 1 micron. The ingredients fed into the mixing chamber are selected for forming a pigment concentrate by conveying the ingredients from a first end of the mixing chamber toward a second end at S4090. After the pigment concentrate paste is formed at S4090, the paste may be output and stored, and/or fed to a second extruder, which may be connected to the first extruder in series.

As shown in FIG. 4, the pigment concentrate may be fed to the second extruder through a feed port at S4110. At S4210, additional ink ingredients may be fed into a feed port of the second extruder or mixing chamber. The additional ink ingredients, such as low-viscosity monomers and leveling agent, are selected for forming an ink product with the pigment concentrate past formed at S4090 as the ingredients and pigment concentrate are blended at S4250. Ink product is formed as the ingredients blended with pigment concentrate are conveyed to a second end of the mixing chamber. The ink product may be cooled and discharged for further processing and/or packaging.

Figure 5A:
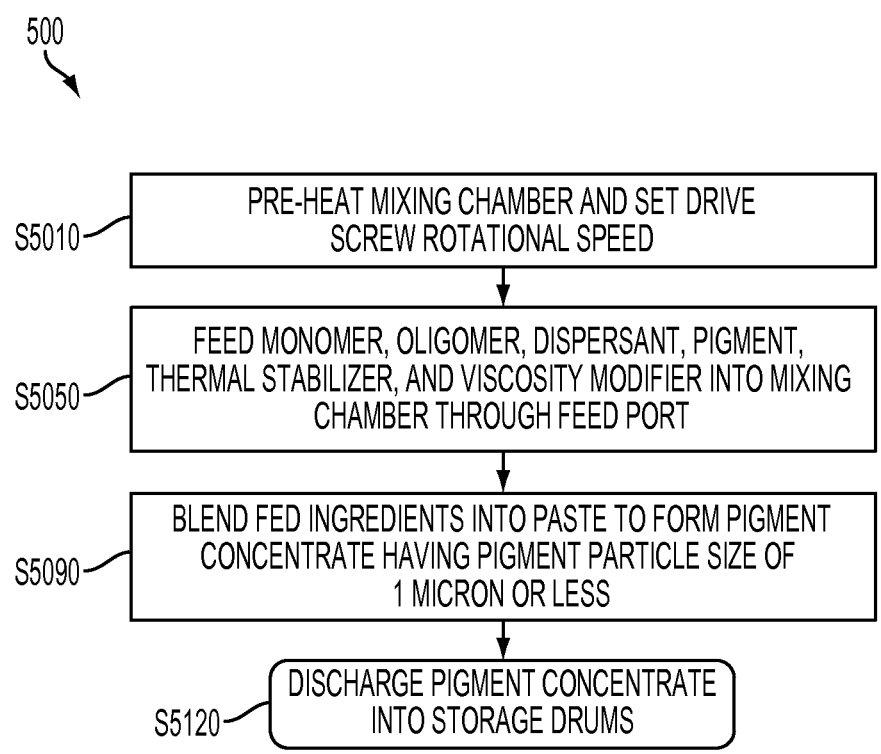
FIG. 5A shows methods continuous manufacture of inks suitable for ink-based digital printing in accordance with another exemplary embodiment.
Figure 5B:
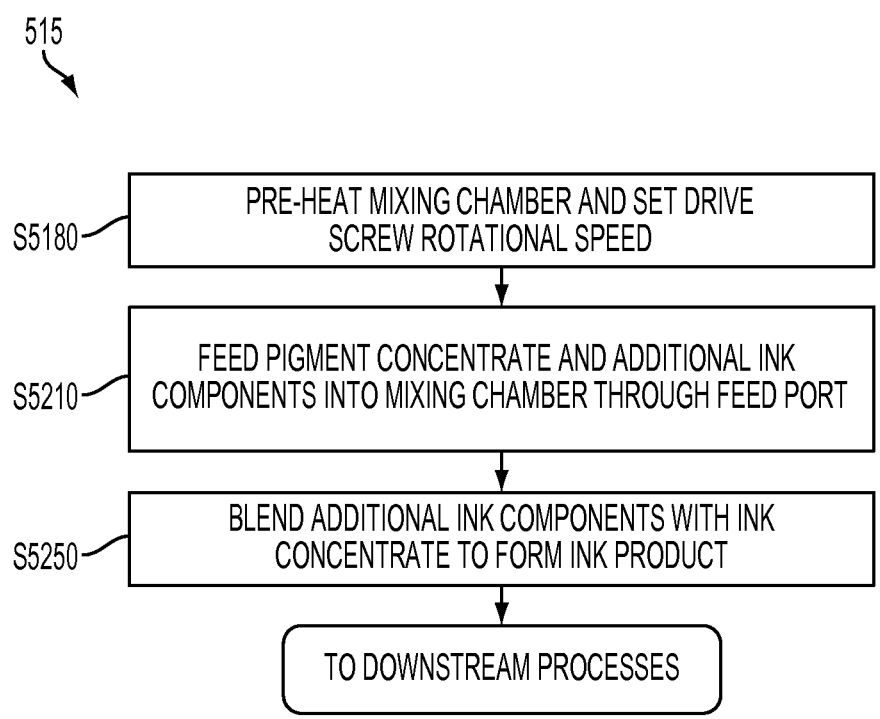
FIG. 5B shows methods continuous manufacture of inks suitable for ink-based digital printing in accordance with the exemplary embodiment of FIG. 5A.
Figure 6:
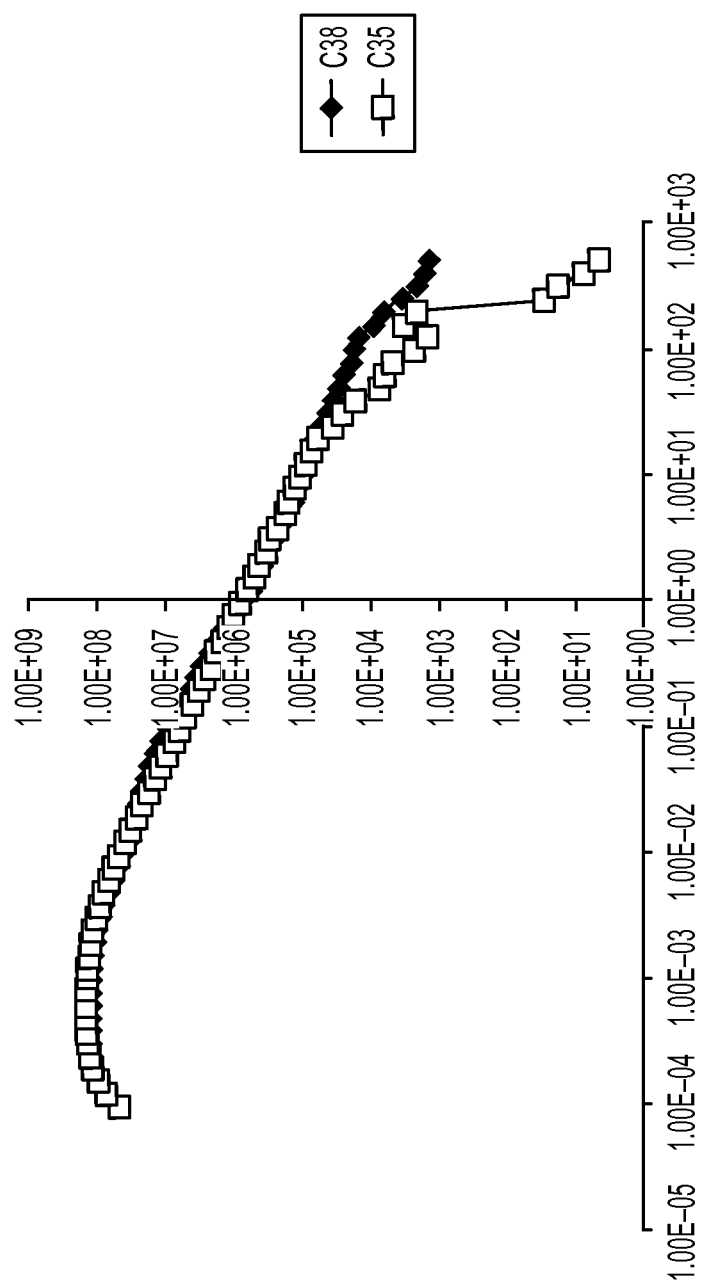
FIG. 6 shows a graph comparing results of rheological analyses and comparisons of ink samples prepared by batch and continuous manufacturing processes.

FIG. 5 shows methods for continuous ink production using a mixing system having one extruder, wherein the system is arranged for forming an ink product by conveying ink ingredients in a first pass through an extruder, and a second pass through the same extruder. As shown in FIG. 5, methods 500 may include initializing the system by, for example, pre-heating a first mixing chamber and setting drive motor rotational speed at S5010. Methods may include feeding ink ingredients at S5050 through one or more feed ports connected to the mixing chamber, such ingredients including monomers, oligomers, dispersant, pigment, thermal stabilizer, and viscosity modifiers such as silica and clay. The monomers may be high viscosity monomers, for example.

The ingredients are conveyed and blended at S5090 by the mixing chamber using high shear force to preferably produce pigment particulates of less than about 1 micron. The ingredients fed into the mixing chamber are selected for forming a pigment concentrate by conveying the ingredients from a first end of the mixing chamber toward a second end at S5090. After the pigment concentrate paste is formed at S4090, the paste may be output and stored, and/or re-introduced to the mixing chamber.

As shown in FIG. 5 methods 515 are for preparing and ink product using a pigment concentrate produced by methods 500. In particular, the pigment concentrate may be fed to the same extruder through a feed port at S5180. At S5210, additional ink ingredients may be fed into a feed port of the extruder. The additional ink ingredients, such as low-viscosity monomers and leveling agent, are selected for forming an ink product with the pigment concentrate past formed at S5090 as the ingredients and pigment concentrate are blended at S5250. Ink product is formed as the ingredients blended with pigment concentrate are conveyed to a second end of the mixing chamber. The ink product may be cooled and discharged for further processing and/or packaging.

EXAMPLE 1

In accordance with an embodiment, a cyan ink suitable for ink-based digital printing was produced by a continuous process. A sample of the product ink was analyzed using a rheometer, and the results plotted for comparison with data pertaining to a liquid cyan ink suitable for ink-based digital printing that was produced using a batch process. The plotted data is shown in the graph of FIG. 3. In particular, FIG. 3 shows rheological results for cyan liquid ink suitable for digital lithographic printing prepared using a continuous process, the ink being identified as DL-INK-C38 ("C38"). The ink prepared by the batch three-mill roll process is identified as DL-INK-C35 ("C35"). The graph shows that the ink produced by a continuous manufacturing process in accordance with embodiments is suitable for digital ink-based printing using systems, such as those disclosed by the 714 Application, for example. In particular, the x-axis shows the shear rate in rotations per second, and the y-axis shows viscosity in centipoise. The plot shows that it was found that there are no significant differences between the ink produced by the batch process, and ink produced by the continuous process.

The C38 ink sample was produced using HAAKE Model 600 RHEOMIX mixer. The ink formulation included the monomers and dispersant materials shown in Table 1. The formulations for the C38 and the C35 ink were identical.

TABLE 1

| Formulation for DL-INK-C35 and DL-INK-C38 | | |
|---|---|---|
| Chemical | wt % | Mass (g) |
| Ciba Irgalite Blue GLO | 15.00 | 45 |
| Sartomer CN2256 | 7.00 | 21.00 |
| Ebecryl 2003 | 41.00 | 123.00 |
| Ebecryl 11 | 9.93 | 29.79 |
| Ebecryl 12 | 17.37 | 52.11 |
| Solsperse 39000 | 4.50 | 13.50 |
| Additol VXL 4951 | 2.00 | 6.00 |
| Ciba Irgastab UV10 | 0.20 | 0.60 |
| Aerosil 200 | 3.00 | 9.00 |
| Total | 100.00 | 300.00 |

A pigment concentrate was first prepared by pre-heating the mixer to 60 degrees Celsius. The mixing screws drive motor was started, and the rotational speed set to 50 RPM. The quantities of monomers, SARTOMER CN2256 and EBERCRYL 2003, shown in FIG. 3 were added to the mixer along with dispersant (SOLSPERSE 3900). The ingredients were fed into a feed port of the mixer, and blended into a paste. The prescribed quantities of thermal stabilizer (CIBA IRGASTAB UV10), pigment (CIBA IRGALITE GLO), and viscosity modifier (AEROSIL 200) were then added to the mixer through the feed port. The ingredients were blended for 30 minutes to form a homogenous paste of pigment concentrate. The temperature of the mixer was then lowered to about 40 degrees Celsius. The mixing screw was turned off, the mixer was opened, and the contents discharged into a brown glass bottle using a spatula.

Then, the mixer was pre-heated to 60 degrees Celsius. The mixing screws drive motor was started and set to the 50 RPM. The pigment concentrate formed was fed into the mixer through the feed port. The remaining ingredients, including monomers (EBECRYL 2003, EBECRYL 11, EBECRYL 12) and leveling agent (Additol VXL 4951) were added to the mixer. The ingredients were blended for 30 minutes to form the product ink. The mixer temperature was then lowered to about 40 degrees Celsius. The mixing screw motor was turned off. The mixer was opened, and the contents discharged into a brown glass bottle using a spatula.

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

It will be appreciated that the above-disclosed and other features and functions, or alternatives thereof, may be desirably combined into many other different systems or applications. Also, various presently unforeseen or unanticipated alternatives, modifications, variations or improvements therein may be subsequently made by those skilled in the art.

What is claimed is:

1. A method of continuously producing radiation-curable liquid ink, comprising:
    heating a first section of a mixing chamber of a mixer to a first temperature of at least 60 degrees Celsius to 90 degrees Celsius;
    continuously providing ink ingredients to a first end of the mixing chamber, the ingredients being selected for forming a pigment concentrate liquid paste of a radiation-curable liquid ink product;
    blending the ink ingredients at the first section of the mixing chamber downstream the first end toward a second end of the mixing chamber to form the pigment concentrate liquid paste in the mixing chamber, the pigment concentrate liquid paste being a blended combination of all ingredients provided to the mixing chamber while keeping all ingredients in the mixing chamber, the pigment concentrate liquid paste having a pigment particle diameter of about 1 micron or less;
    conveying the pigment concentrate liquid paste to a second section of the mixing chamber downstream the first section towards the second end and opposite the first end;
    cooling the second section of the mixing chamber to a second temperature less than the first temperature;
    conveying the pigment concentrate liquid paste to a third section of the mixing chamber downstream the second section toward the second end of the second mixing chamber;
    feeding additional ink ingredients into the third section of the mixing chamber, the ingredients comprising at least one of low-viscosity monomers, oligomers, mixtures thereof, and leveling agent;
    heating the third section of the mixing chamber to the first temperature; and
    blending the pigment concentrate liquid paste and the additional ink ingredients in the third section to produce the radiation-curable liquid ink product by conveying the ink ingredients toward the second end for continuous output from the mixer.

2. The method of claim 1, the providing ingredients further comprising:
    feeding the ingredients into a mixing chamber of the mixer at a feed port at the first end of the mixing chamber, the ingredients comprising pigment and at least one of monomers, oligomers, dispersant, thermal stabilizer, and viscosity modifier, the viscosity modifier being selected from at least one of clay and silica.

3. The method of claim 1, where the heating the mixing chamber to the first temperature of at least 60 degrees Celsius to 90 degrees Celsius includes:
    pre-heating the mixing chamber to a temperature lying in range of at least 60 degrees Celsius to 90 degrees Celsius.

4. The method of claim 1, wherein the mixing chamber first temperature lies in a range of at least 60 degrees Celsius to 90 degrees Celsius during the blending, and wherein a die head pressure of the mixing chamber lies in a range of 2 to 100 psi.

5. The method of claim 1, the method being a continuous method without limit to a particular batch amount with the ink ingredients provided to the first end being output from the second end in less than one minute.

6. The method of claim 1, further comprising outputting the radiation-curable liquid ink product from the mixing chamber at the second end.

7. The method of claim 1, further comprising
    cooling the mixing chamber back to the second temperature for discharge of the cooled radiation-curable liquid ink product.

8. The method of claim 1, the providing ink product ingredients to a first end of a mixing chamber further comprising:
    feeding at least one of low-viscosity monomers, oligomers, mixtures thereof, and leveling agent to the mixing chamber.

9. The method of claim 1, further comprising:
    cooling the radiation-curable liquid ink product by cooling the mixing chamber to the second temperature; and
    outputting the cooled radiation-curable liquid ink product from the mixer.

10. The method of claim 9, comprising:
    processing the radiation-curable liquid ink product using a 3-roll mill.

11. The method of claim 1, the providing ingredients further comprising:
    feeding the ingredients into a mixing chamber of the mixer at a feed port at the first end of the mixing chamber, the ingredients including pigment and a viscosity modifier, the viscosity modifier including a monomer.

12. The method of claim 1, further comprising:
feeding additional ink ingredients to the mixing chamber for mixing with the pigment concentrate liquid paste, the additional ink ingredients including a low viscosity monomer added to the pigment concentrate liquid paste to decrease a viscosity of the pigment concentrate liquid paste; and
blending the additional ink ingredients with the pigment concentrate liquid paste in the mixing chamber to produce the radiation-curable liquid ink product having a lower viscosity than the pigment concentrate liquid paste, the radiation-curable liquid ink product being a blended combination of the pigment concentrate liquid paste and the additional ink ingredients while keeping all of the ingredients in the mixing chamber.

13. A method of continuously producing radiation-curable liquid ink, comprising:
heating a mixing chamber of a mixer to a first temperature of at least 60 degrees Celsius to 90 degrees Celsius;
providing ink ingredients to a first end of the mixing chamber, the ingredients being selected for forming a pigment concentrate liquid paste of a radiation-curable liquid ink product, the providing ink ingredients including continuously feeding the ingredients into a mixing chamber of the mixer at a feed port at the first end of the mixing chamber, the ingredients including pigment and a viscosity modifier, the viscosity modifier including a monomer;
blending the ink ingredients by conveying the ingredients toward a second end of the mixing chamber to form the pigment concentrate liquid paste in the mixing chamber, the pigment concentrate liquid paste being a blended combination of all ingredients provided to the mixing chamber while keeping all of the ingredients in the mixing chamber, the pigment concentrate liquid paste having a pigment particle diameter of about 1 micron or less;
cooling the second end of the mixing chamber to a second temperature less than the first temperature to cool the pigment concentrate liquid paste;
conveying the pigment concentrate liquid past from the second end to the mixing chamber to the feed port at the first end of the mixing chamber;
reheating the mixing chamber to the first temperature;
feeding additional ink ingredients to the mixing chamber for mixing with the pigment concentrate liquid paste, the additional ink ingredients including a low viscosity monomer added to the pigment concentrate liquid paste to decrease a viscosity of the pigment concentrate liquid paste;
blending the additional ink ingredients with the pigment concentrate liquid paste in the mixing chamber to produce the radiation-curable liquid ink product at the second end of the mixing chamber, the radiation-curable liquid ink product configured for ink-based digital printing, the radiation-curable liquid ink product having a lower viscosity than the pigment concentrate liquid paste and being a blended combination of the pigment concentrate liquid paste and the additional ink ingredients without disposal of any ingredients out of the mixing chamber; and
cooling the second end of the mixing chamber to the second temperature for cooling and continuous discharge of the radiation-curable liquid ink product, wherein the ink ingredients provided to the first end of the mixer are discharged from the second end in less than one minute.

* * * * *